(12) United States Patent
Wang et al.

(10) Patent No.: US 9,930,576 B2
(45) Date of Patent: Mar. 27, 2018

(54) APPARATUS, COMPUTER PROGRAM, AND METHOD FOR ACCELERATION OF A HANDOVER UPON MOBILE DEVICE SIGNAL DEGRADATION

(71) Applicant: Futurewei Technologies, Inc., Plano, TX (US)

(72) Inventors: Julia Wang, San Diego, CA (US); Yumin Tang, San Diego, CA (US); Tongzeng Yang, San Diego, CA (US); Limei Wang, San Diego, CA (US)

(73) Assignee: Futurewei Technologies, Inc., Plano, TX (US)

( * ) Notice: Subject to any disclaimer, the term of this patent is extended or adjusted under 35 U.S.C. 154(b) by 0 days.

(21) Appl. No.: 15/208,543

(22) Filed: Jul. 12, 2016

(65) Prior Publication Data

US 2018/0020380 A1 Jan. 18, 2018

(51) Int. Cl.
*H04W 36/00* (2009.01)
*H04W 24/10* (2009.01)
*H04L 5/00* (2006.01)
*H04W 4/00* (2009.01)

(52) U.S. Cl.
CPC ....... *H04W 36/0005* (2013.01); *H04L 5/0048* (2013.01); *H04W 24/10* (2013.01)

(58) Field of Classification Search
CPC . H04W 36/0005; H04W 36/08; H04W 36/30; H04W 36/0083; H04W 36/18; H04W 52/40; H04W 24/10; H04L 5/0048

USPC ....................................................... 455/436
See application file for complete search history.

(56) References Cited

U.S. PATENT DOCUMENTS

2010/0234014 A1 9/2010 Virkki et al.
2016/0381610 A1* 12/2016 Pu .................... H04W 36/0094
455/436

OTHER PUBLICATIONS

"How to Fix Dropped Calls on a Samsung Galaxy S6," Jan. 8, 2016, pp. 1-3, retrieved from https:// web.archive.org/web/20160108003857/http://www.thecellguide.com/samsungs6droppedcall.php.
Kim, J. et al., "Adaptive Time-to-Trigger Scheme for Optimizing LTE Handover," International Journal of Control and Automation, vol. 7, No. 4, 2014, pp. 35-44.

* cited by examiner

*Primary Examiner* — Huy C Ho
(74) *Attorney, Agent, or Firm* — Zilka-Kotab, PC (57) ABSTRACT

An apparatus, computer program, and method are provided for acceleration of a handover if mobile communication device signaling is degrading. Signal information is received in connection with a mobile communication device being serviced by a cell of a network. It is determined whether the signal information indicates that at least one aspect of a signaling in connection with the mobile communication device is degrading. An acceleration of a handover is conditionally caused in connection with the mobile communication device, if it is determined that the signal information indicates that the at least one aspect of the signaling in connection with the mobile communication device is degrading.

20 Claims, 6 Drawing Sheets

APPARATUS, COMPUTER PROGRAM, AND METHOD FOR ACCELERATION OF A HANDOVER UPON MOBILE DEVICE SIGNAL DEGRADATION

FIELD OF THE INVENTION

The present invention relates to mobile communication systems, and more particularly to handover management in mobile communication systems.

BACKGROUND

Various mobile communication systems offer various services [e.g. voice over long term evolution (VoLTE)] that exhibit connection drop rates that are much higher in certain scenarios. A dropped connection can be an extremely frustrating experience for a user. Further, dropped connections may also impact network reliability and a reputation of carriers, especially in light of governmental standards for reliability of carrier networks.

There are a number of reasons why a connection might drop, which can be categorized by problems with a carrier, or a mobile device (e.g. phone). For example, such problems may include, but are not limited to inadequate coverage, problems with a quality of a signal, interference, low receiver sensitivity/mobility, network congestion, network failure, etc. Since connection maintenance is important for customer satisfaction, a continuing need is felt for reducing a probability of dropped connections.

SUMMARY

An apparatus, computer program, and method are provided for acceleration of a handover if mobile communication device signaling is degrading. Signal information is received in connection with a mobile communication device being serviced by a cell of a network. It is determined whether the signal information indicates that at least one aspect of a signaling in connection with the mobile communication device is degrading. An acceleration of a handover is conditionally caused in connection with the mobile communication device, if it is determined that the signal information indicates that the at least one aspect of the signaling in connection with the mobile communication device is degrading.

In a first embodiment, the signal information may be associated with a reference signal received power (RSRP). Further, the signal information may be associated with a reference signal received quality (RSRQ).

In a second embodiment (which may or may not be combined with the first embodiment), the signal information may be compared with at least one threshold, such that the acceleration of the handover is further conditionally caused, based on the comparison. As a first option, the at least one threshold may be configurable. As a second option, the at least one threshold may include a threshold received over the network (e.g. hysteresis-related threshold, etc.).

In a third embodiment (which may or may not be combined with the first and/or second embodiments), the at least one aspect of the signaling in connection with the mobile communication device may include a power and/or a quality thereof.

In a fourth embodiment (which may or may not be combined with the first, second, and/or third embodiments), it may be determined whether the signal information indicates that the at least one aspect of the signaling is degrading, by comparing different signal measurements that correspond with different times. As an option, such determination may be further accomplished, by calculating a sum of differences between the different signal measurements.

In a fifth embodiment (which may or may not be combined with the first, second, third, and/or fourth embodiments), the acceleration of the handover may be caused by accelerating an initiation of a handover evaluation over the network. For instance, as an option, the acceleration of the handover may be caused by accelerating a transmission of a measurement report over the network that causes the initiation of the handover evaluation. Further, the acceleration of the handover may be caused by setting a timer variable in connection with the transmission of the measurement report over the network that causes the initiation of the handover evaluation. As a first option, the timer variable may include a single timer variable associated with a power threshold and a quality threshold. As a second option, the timer variable may include a first timer variable associated with a power threshold and a second timer variable associated with a quality threshold. Still yet, the timer variable may be set as a function of an amount that the at least one aspect of the signaling has degraded. Even still, the timer variable may be set as a function of a rate that the at least one aspect of the signaling has degraded over time.

To this end, in some optional embodiments, one or more of the foregoing features of the aforementioned apparatus, computer program product and/or method may result in a reduction of a probability of a dropped connection between the mobile communication device and the cell of the network. This may be accomplished by accelerating the initiation of the handover evaluation that potentially results in the handover, in situations where a traditional timer (that initiates measurement reporting required for handover evaluation) would otherwise timeout after signaling has already degraded to a point that would preclude the foregoing measurement reporting over the network. It should be noted that the aforementioned potential advantages are set forth for illustrative purposes only and should not be construed as limiting in any manner.

DETAILED DESCRIPTION

Figure 1:
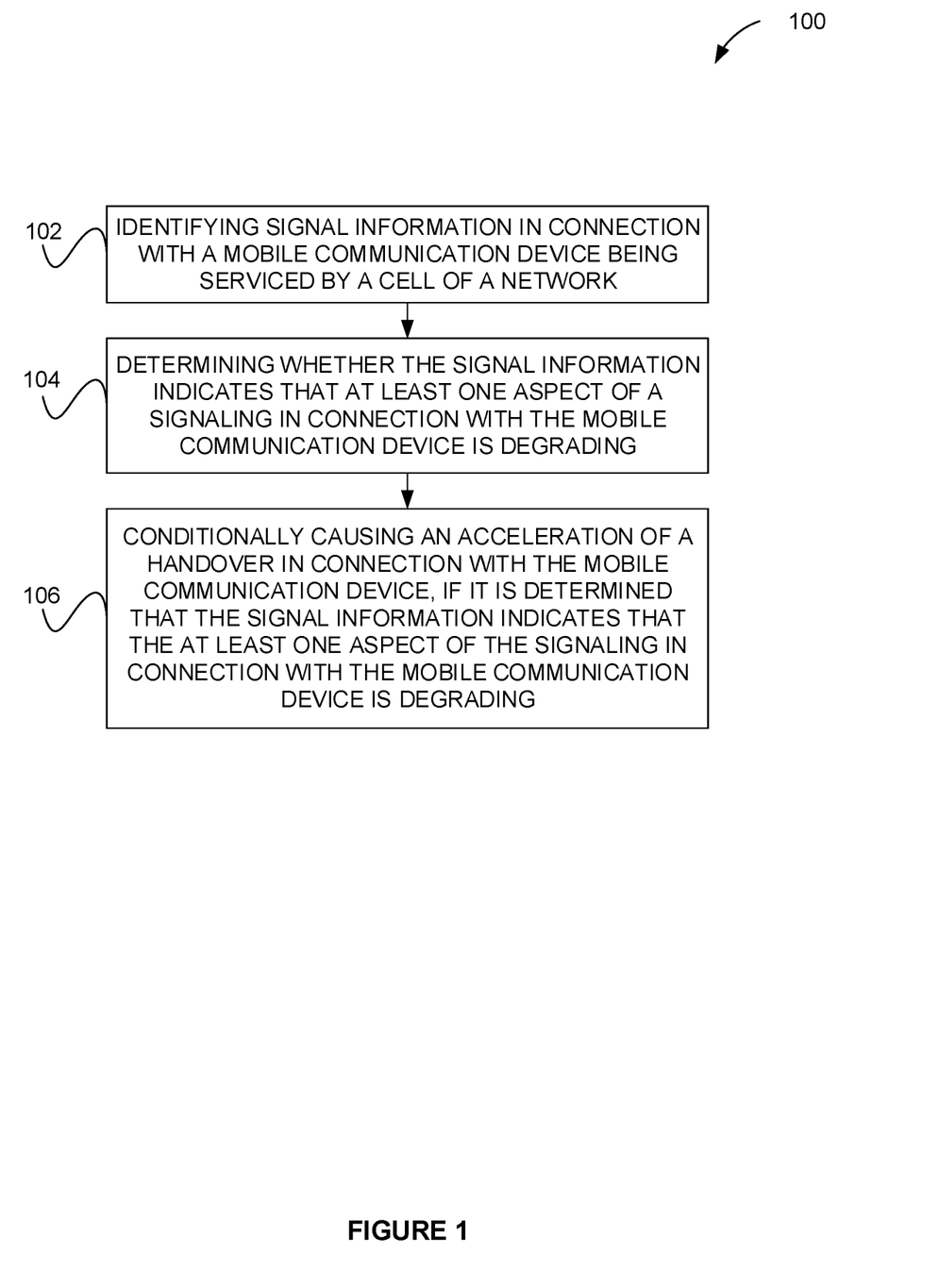
FIG. 1 illustrates a method for acceleration of a handover if mobile communication device signaling is degrading, in accordance with one embodiment.

FIG. 1 illustrates a method 100 for acceleration of a handover if mobile communication device signaling is degrading, in accordance with one embodiment. In the context of the present description, the mobile communication device (or simply "mobile device") may, in various embodiments, include user equipment (UE), a target device, device to device (D2D) UE, machine type UE, UE capable of machine-to-machine (M2M) communication, personal digital assistant (PDA), iPAD™, tablet, mobile terminal, smart phone, laptop embedded equipped (LEE), laptop mounted equipment (LME), universal serial bus (USB) dongle, a vehicle, and/or and any other type of wireless device configured for communicating with a cell.

Non-limiting examples of such cell may include an eNodeB, a Node B, base station (BS), multi-standard radio (MSR) radio node such as an MSR BS, eNode B, network controller, radio network controller (RNC), base station controller (BSC), relay, donor node controlling relay, base transceiver station (BTS), access point (AP), transmission point, transmission nodes, remote radio unit (RRU), remote radio head (RRH), node in a distributed antenna system (DAS), and/or any other cell that is configured for communicating with the mobile device over a network.

In various embodiments, such network may include any network where a mobile device is capable of being served by different cells. For example, such network may include a 4G/LTE/LTE-Advanced network and/or any other advancement/permutation thereof. Further, in one possible embodiment, the method 100 may be used in the context of voice-over-LTE (VoLTE) calls. It should be noted, however, that use of the method 100 with other radio access technology (RAT) networks (e.g. CDMA, 1xEVDO, GSM, WCDMA, BLUETOOTH, WiFi) is contemplated, as well.

As shown in FIG. 1, signal information is received in connection with a mobile device being serviced by a cell of a network. See operation 102. In the context of the present description, the signal information may include any data that describes and/or is derived from one or more signaling measurements in connection with the mobile device. Further, the signal information may be sourced directly from the mobile device, received by the mobile device from the network, and/or identified in any other desired manner that allows for its use.

For example, in various embodiments that will be described later in greater detail, the signal information may be associated with a reference signal received power (RSRP), and/or a reference signal received quality (RSRQ). In the context of the present description, the RSRP is an average (e.g. linear average) of reference signals across a channel bandwidth. Further, the RSRQ indicates a quality of a reference signal. For example, in one embodiment, the RSRQ may be based on the aforementioned RSRP, and a received signal strength indicator (RSSI) that represents a received wide-band power by the mobile device. Equation #1 below includes a sample calculation that may be used to calculate RSRQ, where N represents a number of resource blocks. It is contemplated that the calculation of the RSRP and/or RSRQ may deviate as required by relevant standard(s).

$$RSRQ = \frac{RSRP}{RSSI} * N \qquad \text{Equation \#1}$$

With continuing reference to FIG. 1, it is determined in operation 104 whether the signal information indicates that at least one aspect of a signaling in connection with the mobile device is degrading.

Per operation 106, an acceleration of a handover is conditionally caused in connection with the mobile device, if it is determined that the signal information indicates that the at least one aspect of the signaling in connection with the mobile device is degrading. In the context of the present description, a handover may refer to any operation that results in the mobile device being serviced by another cell other than the cell that is currently servicing the same. Further, the aforementioned signaling may refer to any signal that is communicated (e.g. transmitted and/or received, etc.) between the mobile device and the cell. Still yet, in various embodiments, the at least one aspect of the signaling in connection with the mobile device may include a power, a quality, and/or any other measureable characteristic thereof, in connection with any signal that is communicated (e.g. transmitted and/or received, etc.) between the mobile device and the cell.

In different embodiments, any desired technique may be utilized to implement the determination as to whether the signal information indicates that the at least one aspect of the signaling is degrading. Just by way of example, different signal measurements that correspond with different times may be compared. Such comparison may be accomplished, in one embodiment, by subtracting a less recent signal measurement from a more recent signal measurement. In another embodiment, such determination may be further accomplished, by calculating a sum of differences between the different signal measurements.

Still yet, the acceleration of the handover may be caused in any manner that is capable of reducing a probability of a dropped connection between the mobile device and the cell of the network. In one embodiment, the acceleration of the handover may be caused by accelerating an initiation of a handover evaluation over the network. In the context of the present description, such handover evaluation may refer to any process that is used to determine whether a handover should actually occur or not. As an option, such handover evaluation may be caused by (e.g. initiated in response to) receipt of a measurement report sent from the mobile device over the network. Thus, in one embodiment, the acceleration of the handover may be caused by accelerating an initiation of a transmission of such a measurement report over the network that, in turn, causes the initiation of the aforementioned handover evaluation.

In various embodiments, the handover acceleration may be caused by setting a timer variable in connection with the transmission of the measurement report over the network. As mentioned earlier, the measurement report causes the initiation of the handover evaluation. As a first option, the timer variable may include a single timer variable associated with a power threshold and a quality threshold. As a second option, the timer variable may include a first timer variable associated with a power threshold and a second timer variable associated with a quality threshold. Still yet, the timer variable may be set as a function of an amount that the at least one aspect of the signaling has degraded. Even still, the timer variable may be set as a function of a rate that the at least one aspect of the signaling has degraded over time. More information regarding various ways that the handover acceleration may be caused by setting a timer variable will be set forth in greater detail during reference to subsequent embodiments.

Strictly as an option, the handover acceleration may be additionally conditioned on other factors. For example, the signal information may be compared with at least one threshold, such that the acceleration of the handover is further conditionally caused, based on the comparison. As a first option, the at least one threshold may be configurable. As a second option, the at least one threshold may include a threshold received over the network (e.g. a hysteresis-related threshold, etc.). In the context of the present description, such hysteresis may include a parameter used within an entry and leave condition of an event-triggered reporting condition. In various optional embodiments, the foregoing additional conditions may be put in place such that they must be met, before the determination (regarding signal degradation) is even performed, for selectively avoiding such processing/analysis in certain circumstances.

To this end, in some optional embodiments, one or more of the foregoing features may result in a reduction of a probability of a dropped connection between the mobile device and the cell of the network. This may be accomplished by accelerating the initiation of the handover evaluation that potentially results in the handover, in situations where a traditional timer (that initiates measurement reporting required for handover evaluation) would otherwise timeout after signaling has already degraded to a point that would preclude the foregoing measurement reporting over the network. It should be noted that the aforementioned potential advantages are set forth for illustrative purposes only and should not be construed as limiting in any manner.

More illustrative information will now be set forth regarding various optional architectures and uses in which the foregoing method may or may not be implemented, per the desires of the user. It should be noted that the following information is set forth for illustrative purposes and should not be construed as limiting in any manner. Any of the following features may be optionally incorporated with or without the exclusion of other features described.

Figure 2:
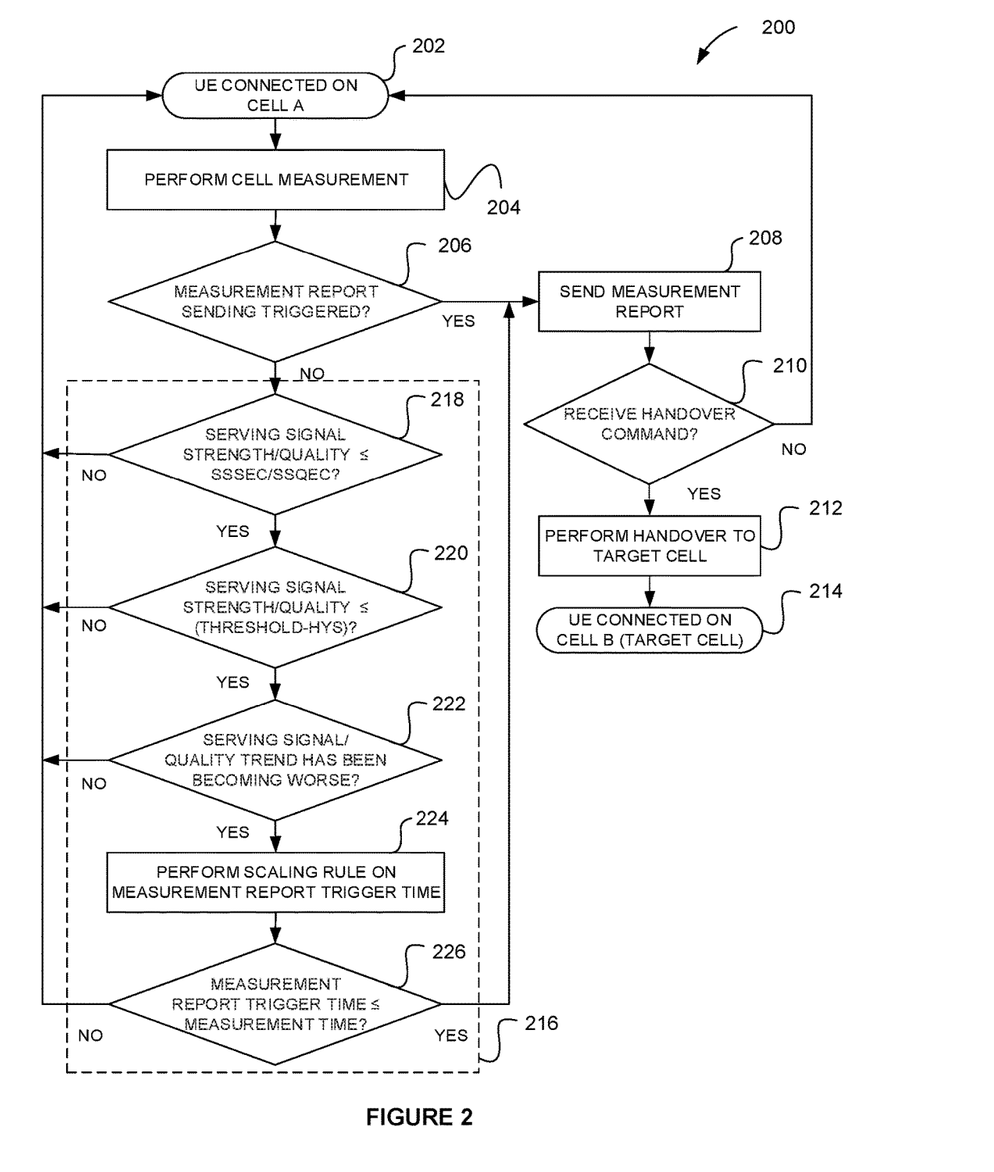
FIG. 2 illustrates a method for acceleration of a handover if mobile communication device signaling is degrading, in accordance with another embodiment.

FIG. 2 illustrates a method 200 for acceleration of a handover if mobile device signaling is degrading, in accordance with another embodiment. As an option, the method 200 may incorporate one or more features of any one or more of the embodiments set forth in any previous and/or subsequent figure(s) and/or description thereof. However, it is to be appreciated that the method 200 may be implemented in the context of any desired environment.

As shown, the method 200 begins with a mobile device (e.g. UE) connected to a serving cell (e.g. Cell A). See state 202. On a repeated (e.g. periodic) or other basis (e.g. upon prompting), the mobile device performs cell measurements in step 204.

Such cell measurements may involve the receipt of reference signals from one or more other cells and generating measurement information in the form of RSRP and/or RSRQ information. It is then determined whether such cell measurements should be sent over a network in decision 206. If so, the measurement report is sent in step 208. While not shown, such measurement report causes a handover evaluation to occur remote from the mobile device (e.g. at a particular cell or other remote location on the network). Specifically, it is determined whether the measurement report warrants a switch involving a connection with the mobile device, from the serving cell, to another target cell, etc.

By this design, the mobile device awaits receipt of a handover command in decision 210. In response to such handover command, the mobile device performs the handover to the target cell. See operation 212. This, in turn, results in the mobile device being serviced by the target cell (e.g. Cell B). See operation 214.

Returning to decision 206, such decision may involve a comparison of signal information (e.g. serving cell signal strength/quality) against a predetermined threshold. Specifically, decision 206 may determine whether the serving cell signal strength/quality is less than the predetermined threshold. In one embodiment, such predetermined threshold may be configured by and received from the network (e.g. via a cell). For example, such predetermined threshold may include a threshold-RSRP-hysteresis, a threshold-RSRQ-hysteresis, or any other threshold, for that matter. Still yet, the decision 206 may further determine whether the serving cell signal strength/quality remains less than the predetermined threshold, for a predetermined amount of time.

If it is determined in the decision 206 that the serving cell signal strength/quality does not remain less than the predetermined threshold (for the predetermined amount of time), an additional sub-process 216 may be performed to nonetheless initiate the transmission of the measurement report (see step 208), if certain other criteria are met. To this end, any delay in decision 206 may be circumvented under certain circumstances where, for example, signal degradation may occur to the point where the transmission of the measurement report may not even be possible (and thus result in a dropped connection).

Specifically, in decision 218, a threshold initial condition is tested to determine whether further processing of the additional sub-process 216 is warranted. In particular, in decision 218, the serving signal strength and/or quality (e.g. as indicated by the RSRP and/or RSRQ) is compared to a configurable threshold. In one embodiment, such comparison may determine whether the serving signal strength and/or quality is less-than, or less-than-or-equal-to the configurable threshold.

In one possible embodiment, the configurable threshold may include a strength-related threshold [e.g. servingSignalStrengthEnteringCondition(SSSEC)], and a quality-related threshold [e.g. servingSignalQualityEnteringCondition (SSQEC)]. Further, in another strictly optional embodiment, the configurable threshold may be any integer value between the range of −110 and −130 dB (or any sub-range thereof). As will soon become apparent, the decision 218 may serve as a "coarse" filter to avoid further processing if a certain "coarse" threshold is not met. Further, as an option, the decision 218 may or may not determine whether the foregoing criteria is met for a predetermined amount of time.

In various embodiments, the configurable threshold may be set by the mobile device and/or the network (and received therefrom). Further, the configurable threshold may be static (e.g. set once at start-up) and/or dynamic (e.g. set multiple times during operation based on any desired criteria). For example, in one embodiment, the configurable threshold may include separate thresholds for serving signal power and quality (e.g. servingSignalStrengthEnteringCondition, servingSignalQualityEnteringCondition).

If it is determined in decision 218 that the serving signal strength and/or quality is indeed less-than-or-equal-to the configurable threshold, the additional sub-process 216 may continue with additional decisions. In particular, in decision 220, the serving signal strength and/or quality (e.g. RSRP and/or RSRQ that may or may not be the same as that used in decision 218) is compared to an additional threshold (that is different from that in decision 218). Specifically, in one embodiment, such additional threshold may be received over the network from another network component (e.g. cell). Further, the additional threshold may be associated with (e.g. specific to) a particular cell, network, geographical region, or anything else, for that matter. For example, in one embodiment, the additional threshold may include a power-related threshold (e.g. threshold-RSRP-hysteresis) and/or a quality-related (e.g. threshold-RSRQ-hysteresis).

As shown in decision 220, the foregoing comparison may determine whether the serving signal strength and/or quality is less-than-or-equal-to the configurable threshold. In one embodiment, the configurable threshold may be received from the serving cell. Further, as in decision 218, other operators are contemplated (e.g. just less-than). Further, as an option, the decision 220 may or may not determine whether the foregoing criteria is met for a predetermined amount of time. In one embodiment, the decision 220 may or may not be similar to (or the same as) that which is carried out in connection with decision 206.

If it is determined in decision 220 that the serving signal strength and/or quality is indeed less-than-or-equal-to the additional threshold(s) (e.g. threshold-RSRP-hysteresis and/or threshold-RSRQ-hysteresis), the additional sub-process 216 may continue with yet another decision. Specifically, in decision 222, it may be determined whether a trend of the serving signal strength and/or quality is becoming worse. In various embodiments, such determination may be accomplished in any manner that reveals whether the serving signal strength and/or quality (e.g. RSRP and/or RSRQ that may or may not be the same as that used in decisions 218/220) is degrading. Equations #2A/2B illustrates one particular technique for identifying serving signal strength and/or quality degradation.

$$\left(\sum_{i=1}^{tCNM}(measuredServingRSRP(i+1) - measuredServingRSRP(i))\right) < 0; \text{ and}$$

$$(measuredServingRSRP(i+1) - measuredServingRSRP(i)) \leq 0; \text{ for } i = 1, \ldots, tCNM$$

Equation #2A $$\left(\sum_{i=1}^{tCNM}(measuredServingRSRQ(i+1) - measuredServingRSRQ(i))\right) < 0; \text{ and}$$

$$(measuredServingRSRQ(i+1) - measuredServingRSRQ(i)) \leq 0; \text{ for } i = 1, \ldots, tCNM$$

Equation #2B

In use, a number of measurements (e.g. tCNM) and/or a period of time (e.g. trendConfigureableTime) may be configurable by the mobile device and/or the network (and received therefrom). Further, the measurements (e.g. measuredServingRSRQ, measuredServingRSRP) may reflect a serving signal strength and/or quality (e.g. as indicated by the RSRP and/or RSRQ). Still yet, in one possible embodiment, the number of measurements (e.g. tCNM) may include a most recent measurement, as well as each temporally adjacent measurement taken before then. Further, the number of measurements (e.g. tCNM) may be a function of the configurable period of time (e.g. trendConfigureableTime). For example, the number of measurements (e.g. tCNM) may or may not include all of those that were performed during the configurable period of time (e.g. trendConfigureableTime).

As indicated by Equations #2A/2B, a first test involves a sum of differences between each temporally adjacent pair of measurements. Specifically, a first difference may be calculated between a most recent measurement and a second-most recent measurement, a second difference may be calculated between the second-most recent measurement and a third-most recent measurement, and a last difference may be calculated between a second-to-last measurement and a least recent measurement, etc. Further, the foregoing differences may be summed to determine whether the sum is less than zero (0). The decision 222 may thus be decided in the affirmative if both the summed differences is less than zero (0), and the first difference is less than or approximately equal to zero 0). It should be noted that other embodiments are contemplated using different logic for assessing any degradation of signaling. Just by way of example, the decision 222 may be decided in the affirmative if either the summed differences is less than zero (0), or the first difference is less than zero (0).

Thus, the additional sub-process 216 may continue if each of decisions 218, 220, and 224 are decided in the affirmative. Specifically, a scaling rule may be implemented on a trigger time variable for triggering the transmission of the measurement report (which, in turn, causes the handover evaluation). Specifically, using such scaling rule, such trigger time variable may be set as a lower trigger time value (e.g. scaledMRTriggerTime), utilizing Equations #3A/3B/3C below.

$$scaledMRTriggerTime = timeToTrigger - offsetOfTimetoTriggerMR;$$

Equation #3A $$aSRSRPCS = \left|\frac{measuredServingRSRP(tCNM) - measuredServingRSRP(1)}{time(measuredServingRSRP(tCNM)) - time(measuredServingRSRP(1))}\right|$$

Equation #3B $$aSRSRQCS = \left|\frac{measuredServingRSRQ(tCNM) - measuredServingRSRQ(1)}{time(measuredServingRSRQ(tCNM)) - time(measuredServingRSRQ(1))}\right|$$

Equation #3C

As shown, the lower trigger time value (e.g. scaledMRTriggerTime) may be calculated by subtracting an offset value (e.g. offsetOfTimetoTriggerMR) from an original value (e.g. TimetoTrigger). See Equation #3A. As mentioned earlier, the original value (e.g. TimetoTrigger) is that which dictates measurement report transmission in decision 206, and is specified by the network (and received via the serving cell).

Still yet, to facilitate calculation of the offset value (e.g. offsetOfTimetoTriggerMR), an average serving RSRP and/or RSRQ drop speed for tCNM (e.g. aSRSRPCS, aSRSRQCS) are calculated. Specifically, such average serving RSRP and/or RSRQ drop speed (e.g. aSRSRPCS, aSRSRQCS) are calculated by determining a numerator of a ratio via a difference between a latest, most recent measurement (e.g. measuredServingRSRQ(tCNM), measuredServingRSRP(tCNM)) and an oldest measurement (e.g. measuredServingRSRQ(1), measuredServingRSRP(1)) within the aforementioned configurable period of time (e.g. trendConfigureableTime). Still yet, a denominator of the foregoing ratio may be calculated by a difference in the times (i.e. period between) the latest, most recent measurement and the oldest measurement (e.g. time (measuredServingRSRP(tCNM)−measuredServingRSRP(1)), time (measuredServingRSRQ(tCNM)−measuredServingRSRQ(1)). Again, see Equations #3B/C.

After the calculations in Equations #3B/C are performed, the offset value (e.g. offsetOfTimetoTriggerMR) of Equation #3A may depend on aSRSRPCS/aSRSRQCS. For example, the offset value (e.g. offsetOfTimetoTriggerMR) may be a result between a value of Enumerated {0, 40, 64, 80, 100, 128, 160, 256, 320, 480, 512, 640, 1024, 1280, 2560, 5120} to timeToTriggerMR to which aSRSRPCS/aSRSRQCS is mapped. In other embodiments, the offset value (e.g. offsetOfTimetoTriggerMR) may also have a linear relation with aSRSRPCS/aSRSRQCS(offsetOfTimetoTriggerMR=K* aSRSRPCS/aSRSRQCS), where K may be a enumerated type parameter.

To this end, the lower time to trigger value (e.g. scaledMRTriggerTime) of Equation #3A is decided. If the scaledMRTriggerTime is less than or equal to the interval of the serving cell measurement, the method 200 may proceed to step 208. On the other hand, if the lower time to trigger value (e.g. scaledMRTriggerTime) of Equation #3A is larger than the interval of the serving cell measurement, the method 200 may go back to step 202. The lower trigger time value may be used in lieu of the original value for the trigger time variable, to accelerate an initiation of the handover evaluation process (and potentially a handover), by accelerating the transmission of the requisite measurement report.

Figure 3:
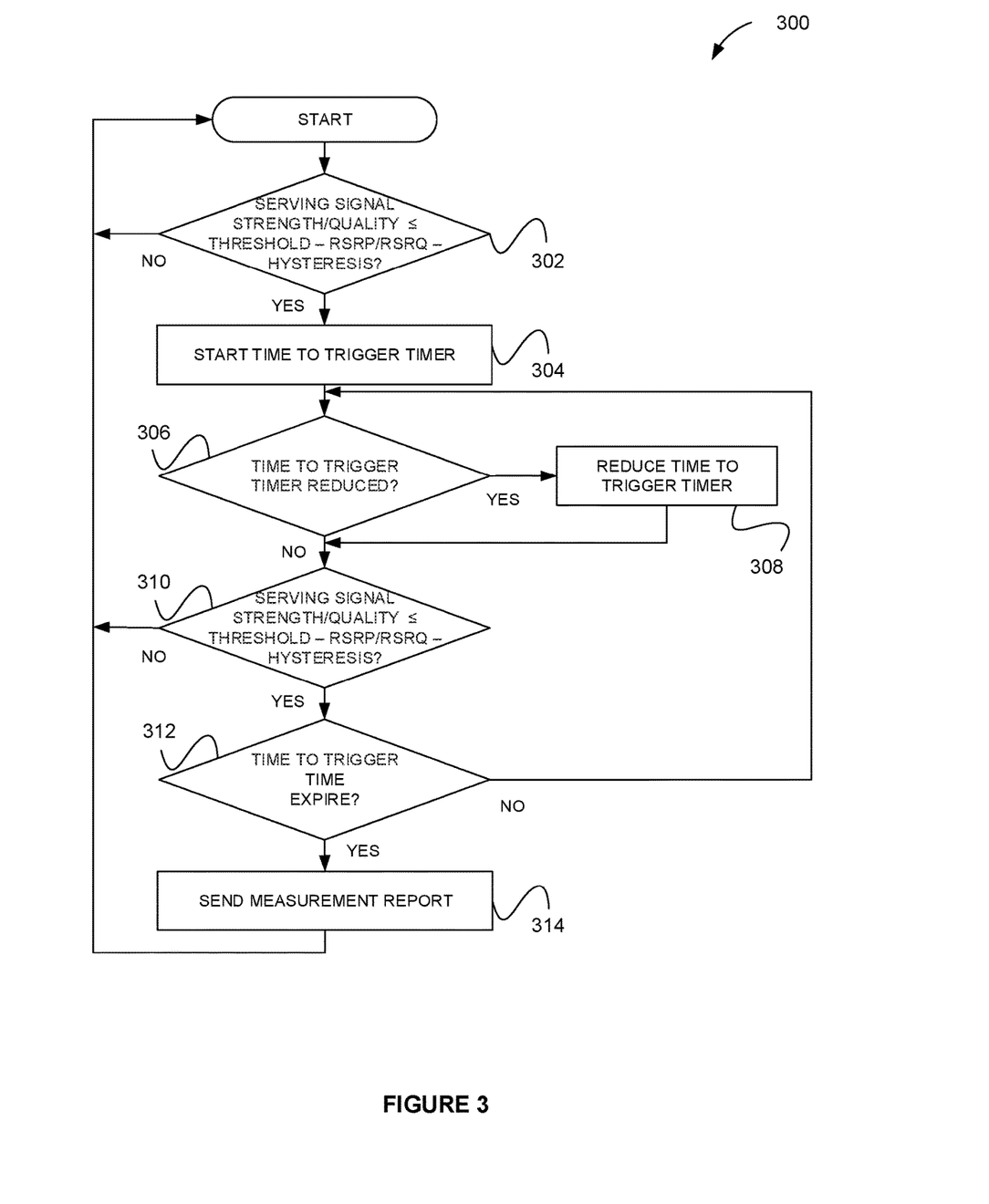
FIG. 3 illustrates a method for setting a trigger time variable, in accordance with one embodiment.

FIG. 3 illustrates a method 300 for setting a trigger time variable, in accordance with one embodiment. As an option, the method 300 may be implemented in the context of any one or more of the embodiments set forth in any previous and/or subsequent figure(s) and/or description thereof. For example, the method 300 may be implemented in the context of decision 206 of FIG. 2. However, it is to be appreciated that the method 300 may be implemented in the context of any desired environment.

As shown, the method 300 starts with decision 302 where it is determined whether the serving signal strength and/or quality is indeed less-than-or-equal-to certain threshold(s) (e.g. threshold-RSRP-hysteresis and/or threshold-RSRQ-hysteresis). If so, a timer that is set at an original trigger time value (e.g. TimetoTrigger) may be started in step 304. While the timer counts down, it may be determined whether the original trigger time value (e.g. TimetoTrigger) has been reduced in decision 306. See, for example, step 224 of FIG. 2. If so, such original trigger time value may be set to a lower trigger time value (e.g. scaledMRTriggerTime described during reference to FIG. 2). See step 308. In other possible embodiments, the steps 306-308 may be only performed before operation 304, or, in other embodiments, be performed at both positions in the method 300.

The method 300 continues by continuously determining whether the serving signal strength and/or quality is indeed less-than-or-equal-to the certain threshold(s) (e.g. threshold-RSRP-hysteresis and/or threshold-RSRQ-hysteresis) in decision 310, until the timer expires per decision 312. As long as the serving signal strength and/or quality remains less-than-or-equal-to the certain threshold(s) (e.g. threshold-RSRP-hysteresis and/or threshold-RSRQ-hysteresis) until the timer expires, the measurement report is transmitted in step 314.

It should be noted that the foregoing method 300 is set forth for illustrative purpose only and should be construed as limiting in any manner. Just by way of example, the decision 310 need not necessarily be continuously checked until time expiration and, instead, be checked just once after timer expiration. Further, while not shown, the lower trigger time value (e.g. scaledMRTriggerTime described during reference to FIG. 2) may be switched back to the original trigger time value (e.g. TimetoTrigger), if any condition (e.g. decisions 218-222 of FIG. 2) is no longer met.

Figure 4:
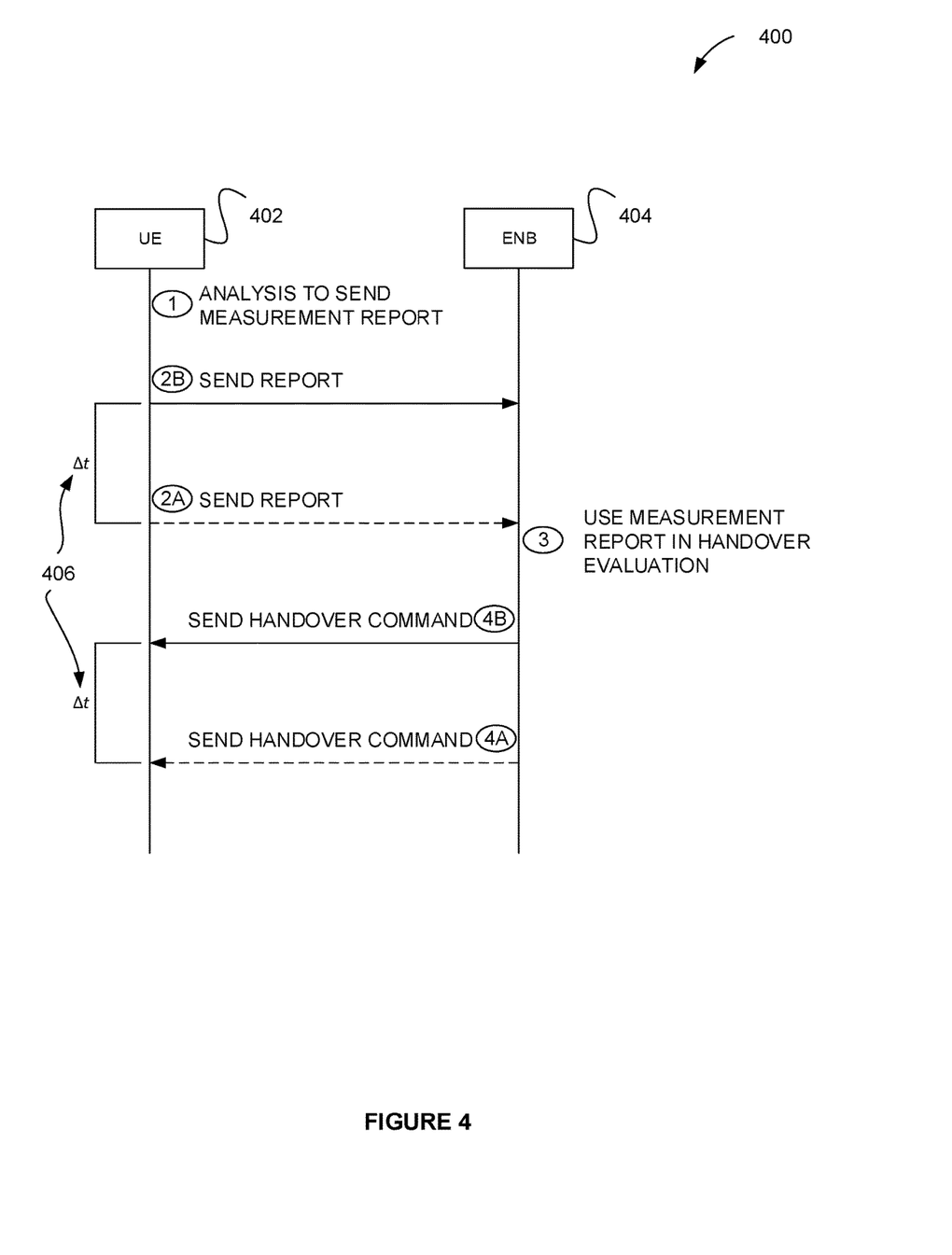
FIG. 4 illustrates a method for accelerating a handover, in accordance with one embodiment.

FIG. 4 illustrates a method 400 for accelerating a handover, in accordance with one embodiment. As an option, the method 400 may be implemented in the context of any one or more of the embodiments set forth in any previous and/or subsequent figure(s) and/or description thereof. However, it is to be appreciated that the method 400 may be implemented in the context of any desired environment.

As shown, a mobile device 402 (e.g. UE) communicates with a cell 404 (e.g. eNodeB). Specifically, in step 1, an analysis is performed by the mobile device 402 to determine whether to send a measurement report in step 2A (e.g. based on a threshold/time trigger, etc.). Upon receipt, such measurement report is used by the cell 404 in a handover evaluation in step 3. If a handover is warranted, a handover command is sent in step 4A from the cell 404 to the mobile device 402, for initiating a handover involving the mobile device 402.

During use, step 1 may be modified (using any technique(s) such as those described during reference to FIGS. 1-3), for initiating the transmission of the measurement report earlier (as in step 2B) for initiating the handover evaluation in step 3 sooner than it would otherwise occur. By this design, the handover command (and thus the handover) would also occur sooner (as in step 4B), so as to decrease a probability that a connection between the mobile device and the cell 404 degrades to the point where the measurement report cannot even been transmitted, as would be the case in step 2A. Such time differential 406 is shown in FIG. 4.

Figure 5:
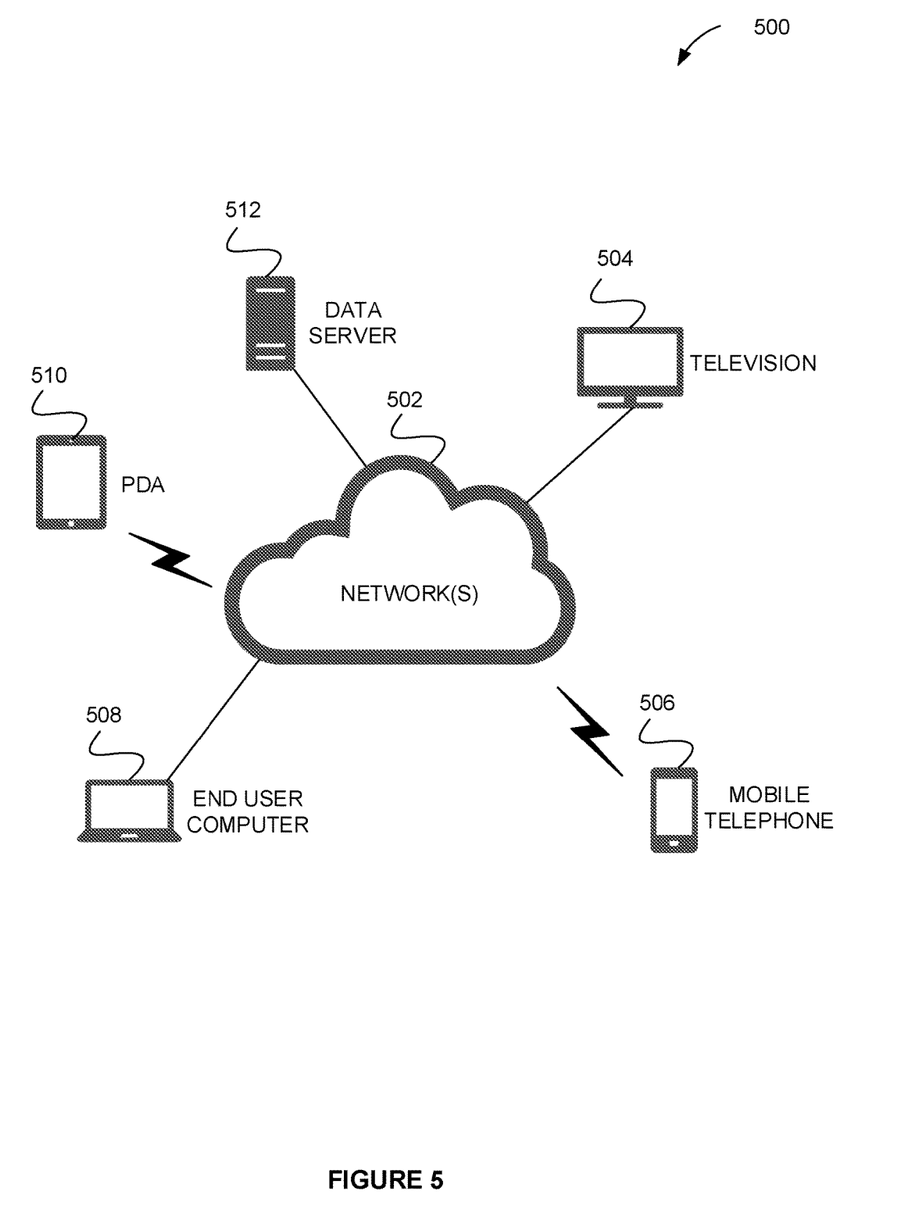
FIG. 5 illustrates a network architecture, in accordance with one embodiment.

FIG. 5 illustrates a network architecture 500, in accordance with one embodiment. As shown, at least one network 502 is provided. In one embodiment, one or more features of any one or more of the embodiments set forth in any previous figure(s) may be implemented in the context of any component of the network architecture 500.

In the context of the present network architecture 500, the network 502 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 502 may be provided.

Coupled to the network 502 is a plurality of devices. For example, a server computer 512 and an end user computer 508 may be coupled to the network 502 for communication purposes. Such end user computer 508 may include a desktop computer, lap-top computer, and/or any other type of logic. Still yet, various other devices may be coupled to the network 502 including a personal digital assistant (PDA) device 510, a mobile phone device 506, a television 504, etc.

Figure 6:
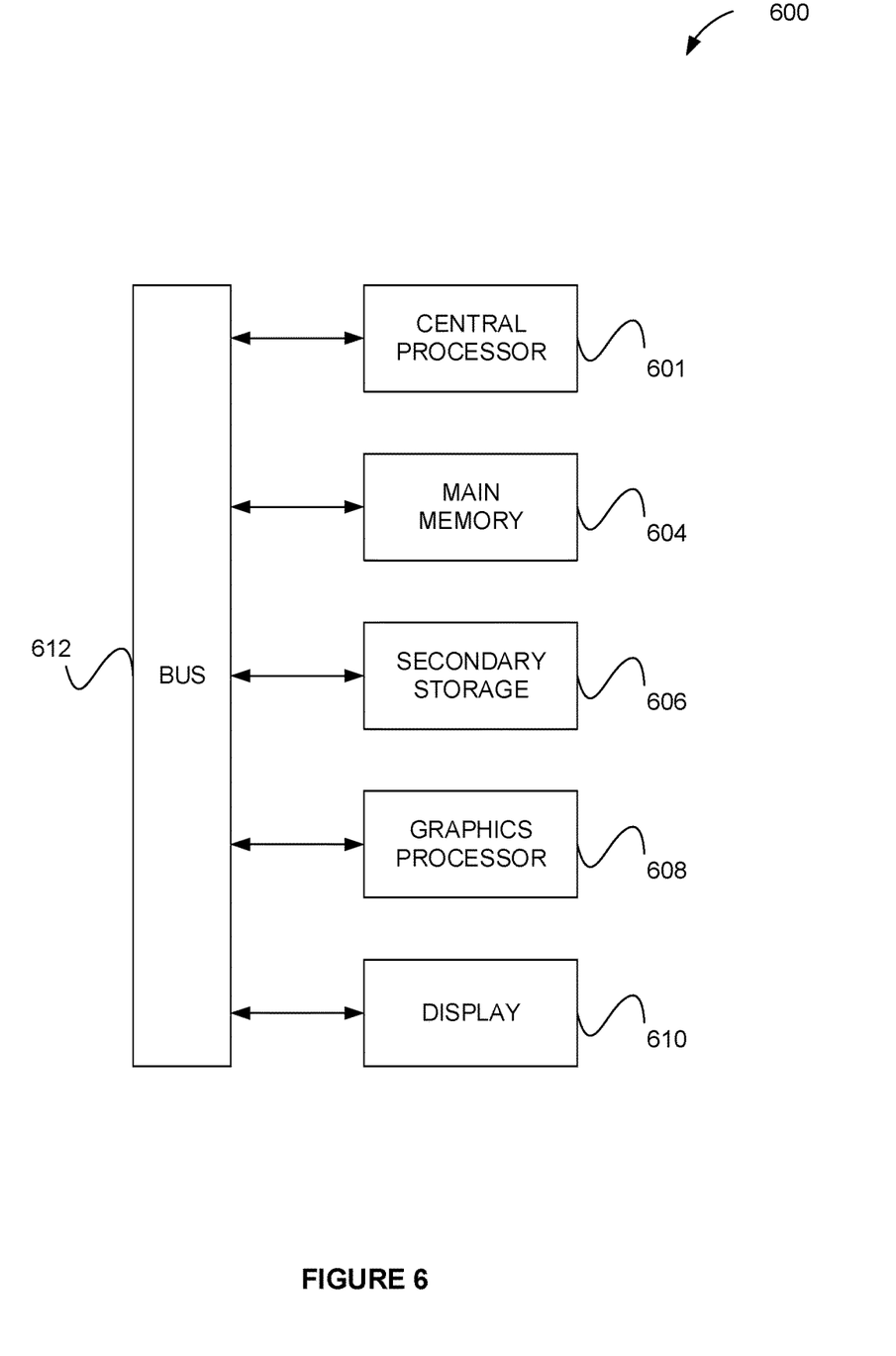
FIG. 6 illustrates an exemplary system, in accordance with one embodiment.

FIG. 6 illustrates an exemplary system 600, in accordance with one embodiment. As an option, the system 600 may be implemented in the context of any of the devices of the network architecture 500 of FIG. 5. However, it is to be appreciated that the system 600 may be implemented in any desired environment.

As shown, a system 600 is provided including at least one central processor 602 which is connected to a bus 612. The system 600 also includes main memory 604 [e.g., hard disk drive, solid state drive, random access memory (RAM), etc.]. The system 600 also includes a graphics processor 608 and a display 610.

The system 600 may also include a secondary storage 606. The secondary storage 606 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 604, the secondary storage 606, and/or any other memory, for that matter. Such computer programs, when executed, enable the system 600 to perform various functions (as set forth above, for example). Memory 604, secondary storage 606 and/or any other storage are possible examples of non-transitory computer-readable media.

It is noted that the techniques described herein, in an aspect, are embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media are included which may store data that is accessible by a computer, such as magnetic cassettes, flash memory cards, digital video disks, Bernoulli cartridges, random access memory (RAM), read-only memory (ROM), and the like.

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that various of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein include the one or more modes known to the inventor for carrying out the claimed subject matter. It is to be appreciated that variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

What is claimed is:

1. A method, comprising:
   identifying signal information in connection with a mobile communication device being serviced by a cell of a network;

determining whether the signal information indicates that at least one aspect of a signaling in connection with the mobile communication device is degrading, by comparing different signal measurements that correspond with different times and by further calculating a sum of differences between the different signal measurements; and determining that the signal information indicates that the at least one aspect of the signaling in connection with the mobile communication device is degrading and, based thereon, cause an acceleration of a handover in connection with the mobile communication device.

2. The method of claim 1, wherein the signal information is associated with a reference signal received power (RSRP).

3. The method of claim 1, wherein the signal information is associated with a reference signal received quality (RSRQ).

4. The method of claim 1, and further comprising: comparing the signal information with at least one threshold, wherein the acceleration of the handover is further conditionally caused, based on the comparison of the signal information with the at least one threshold.

5. The method of claim 4, wherein the at least one threshold is configurable.

6. The method of claim 4, wherein the at least one threshold includes a threshold received over the network.

7. The method of claim 1, wherein the at least one aspect of the signaling in connection with the mobile communication device includes a power thereof.

8. The method of claim 1, wherein the at least one aspect of the signaling in connection with the mobile communication device includes a quality thereof.

9. The method of claim 1, wherein the acceleration of the handover is caused by accelerating an initiation of a handover evaluation over the network.

10. The method of claim 9, wherein the acceleration of the handover is caused by accelerating a transmission of a measurement report over the network that causes the initiation of the handover evaluation.

11. The method of claim 10, wherein the acceleration of the handover is caused by setting a timer variable in connection with the transmission of the measurement report over the network that causes the initiation of the handover evaluation.

12. The method of claim 11, wherein the timer variable includes a single timer variable associated with a power threshold and a quality threshold.

13. The method of claim 11, wherein the timer variable includes a first timer variable associated with a power threshold and a second timer variable associated with a quality threshold.

14. The method of claim 11, wherein the timer variable is set as a function of an amount that the at least one aspect of the signaling has degraded.

15. The method of claim 11, wherein the timer variable is set as a function of a rate that the at least one aspect of the signaling has degraded over time.

16. The method of claim 1, wherein the acceleration of the handover results in a reduction of a probability of a dropped connection between the mobile communication device and the cell of the network.

17. An mobile communication device, comprising:
a processor; and
a memory comprising instructions that, when executed by the processor cause the processor to:
identify signal information in connection with the mobile communication device;
determine whether the signal information indicates that at least one aspect of a signaling in connection with the mobile communication device is degrading, by comparing different signal measurements that correspond with different times and by further calculating a sum of differences between the different signal measurements; and
determine that the signal information indicates that the at least one aspect of the signaling in connection with the mobile communication device is degrading and, based thereon, causng cause an acceleration of a handover in connection with the mobile communication device.

18. A computer program product comprising computer executable instructions stored on a non-transitory computer readable medium that when executed by a processor instruct the processor to:
identify signal information in connection with a mobile communication device being serviced by a cell of a network;
determine whether the signal information indicates that at least one aspect of a signaling in connection with the mobile communication device is degrading, by comparing different signal measurements that correspond with different times and by further calculating a sum of differences between the different signal measurements; and
determine that the signal information indicates that the at least one aspect of the signaling in connection with the mobile communication device is degrading and, based thereon, cause an acceleration of a handover in connection with the mobile communication device.

19. The method of claim 1, wherein the calculating the sum of differences between the different signal measurements is characterized by the following equation:

$$\left(\sum_{i=1}^{tCNM}(measuredServingRSRP(i+1) - measuredServingRSRP(i))\right) < 0;$$

and $$(measuredServingRSRP(i+1) - measuredServingRSRP(i)) \le 0;$$

$$\text{for } i = 1, \ldots, tCNM$$

20. The method of claim 1, wherein the calculating the sum of differences between the different signal measurements is characterized by the following equation:

$$\left(\sum_{i=1}^{tCNM}(measuredServingRSRQ(i+1) - measuredServingRSRQ(i))\right) < 0;$$

and $$(measuredServingRSRQ(i+1) - measuredServingRSRQ(i)) \le 0;$$

$$\text{for } i = 1, \ldots, tCNM$$

* * * * *